United States Patent [19]

Reime

[11] Patent Number: 5,315,385
[45] Date of Patent: May 24, 1994

[54] INVERTING THE PHASE OF THE CARRIER OF A FIRST SIGNAL ON A LINE-BY-LINE BASIS TO PREVENT CO-CHANNEL INTERFERENCE WITH A SECOND INDEPENDENTLY TRANSMITTED SIGNAL

[75] Inventor: Gerd Reime, Schömberg, Fed. Rep. of Germany

[73] Assignee: Nokia (Deutschland) GmbH, Pforzheim, Fed. Rep. of Germany

[21] Appl. No.: 850,876

[22] Filed: Mar. 13, 1992

[30] Foreign Application Priority Data

Mar. 15, 1991 [DE] Fed. Rep. of Germany ....... 4108558

[51] Int. Cl.$^5$ .................... H04N 7/04; H04N 7/08; H04N 5/38
[52] U.S. Cl. ................ 348/441; 348/724; 348/21
[58] Field of Search ............. 358/141, 142, 186; 455/1; H04N 5/38, 7/04, 7/08

[56] References Cited

U.S. PATENT DOCUMENTS

| | | |
|---|---|---|
| 2,644,942 | 7/1953 | Bedford . |
| 3,252,094 | 5/1966 | Hughes et al. . |
| 3,700,793 | 10/1972 | Borsuk et al. .................. 358/142 |
| 3,842,196 | 10/1974 | Loughlin ......................... 358/12 |
| 3,924,060 | 12/1975 | Bedford .......................... 358/142 |
| 4,051,532 | 9/1977 | Hilbert et al. .................. 358/142 |
| 4,266,240 | 5/1981 | Levy ................................ 358/142 |
| 4,287,528 | 9/1981 | Ley .................................. 358/142 |
| 4,660,074 | 4/1987 | Schine ............................ 358/16 |
| 4,985,769 | 1/1991 | Yasumoto et al. ............. 358/141 |
| 5,067,017 | 11/1991 | Zucker ............................ 358/141 |
| 5,103,310 | 4/1992 | Gibson et al. .................. 358/141 |

OTHER PUBLICATIONS

"Two Signals Simultaneously Televised Over One Channel", Electronic Design, vol. 6, No. 6, Mar. 19, 1958, pp. 5-7.

K. Blair Benson: "Television Engineering Handbook", McGraw-Hill Book Company, 1986, pp. 4.38-4.43, 4.24-4.34.

EBU Technical Document Tech., 3254-E "Planning parameters and methods for terrestrial television broadcasting in the VHF/UHF bonds" May 1988 Technical Centre-Brussels, pp. 23-34, Chapter 2—Planning parameters for terrestrial television.

EBU Technical Document Tech. 3254-E, "Planning parameters and method for terrestrial television broadcasting in the VHF/UHF bonds" May 1988 Technical Centre-Brussels, pp. 35-50, Appendix A2, CCIR Recommendation 655 Radio-frequency protection ratios for AM vestigial sidebond television systems.

*Primary Examiner*—James J. Groody
*Assistant Examiner*—John W. Miller
*Attorney, Agent, or Firm*—Ware, Fressola, Van Der Sluys & Adolphson

[57] ABSTRACT

The proposed method of broadcasting television signals is such that the phase of the carrier signal as modulated with the video signal is shifted through 180° from one line to the next within a field. Measure ensures that the disturbance signal due to a transmitter operating in the same channel will produce opposite effects from one line to the next, i.e. a brightening in one line and a darkening in the next. These opposite disturbances of adjacent lines are then compensated by the vision of the viewer or by electronic circuits specially designed for this purpose, so that the picture data originating from the interfering transmitter will not be perceived by the viewer.

4 Claims, 1 Drawing Sheet

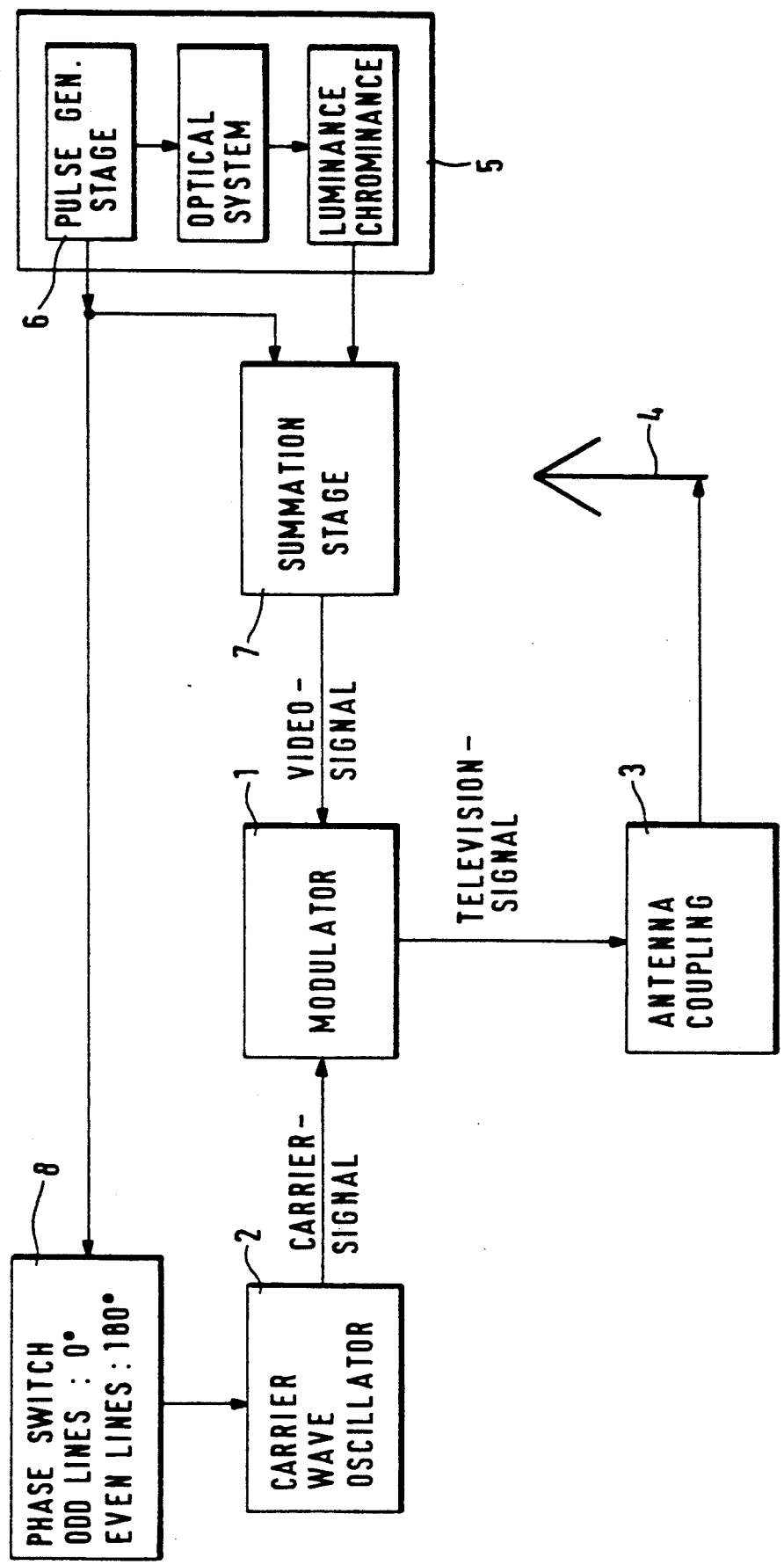

INVERTING THE PHASE OF THE CARRIER OF A FIRST SIGNAL ON A LINE-BY-LINE BASIS TO PREVENT CO-CHANNEL INTERFERENCE WITH A SECOND INDEPENDENTLY TRANSMITTED SIGNAL

TECHNICAL FIELD

The present invention concerns a method of broadcasting television signals.

STATE OF THE ART

With a view to making it possible for television programmes that are broadcast at one and the same time to be received separately by a single television receiver, it is customary for the television signals of different programmes to be broadcast at different carrier frequencies. Each carrier frequency is assigned a channel. The channel spacing in the UHF range may amount to, say, 8 Mhz. When channels are assigned to programmes and stations, it is generally endeavoured to arrange matters in such a way that at any one location only a single station can be received in each of the channels. When there is a danger that two stations operating in the same channel could cause mutual interference at a given reception location, the carrier frequencies are slightly displaced with respect to each other. This is known as offset operation. In Germany it is usual to employ an offset of the order of plus or minus one to twelve twelfths of the line frequency.

Even when these offset frequencies are rigorously observed, an interfering station will still cause visible interference in the form of horizontal lines.

Consequently, there existed the problem of specifying a method of broadcasting television signals that would be more effective in preventing stations that use the same channel causing mutual interference upon reception than has been the case hitherto.

DESCRIPTION OF THE INVENTION

The method of broadcasting television signals according to the present invention is such that the phase of the carrier of one of the stations overating in the same channel without offset is changed within a field by 180° from one line of the video signal to the next. The phase switching is preferably effected within the duration of the non-visible part of the lines.

This measure produces the effect that interference caused by a weaker transmitter operating in the same channel as a more powerful transmitter will always act in opposite directions in successive lines. For example, interference that tends to augment the brightness of a given pixel in a first line will have its counterpart in interference of the same magnitude that will make the same pixel darker in the next line and, of course, vice versa. Such interference acting in opposite directions is automatically compensated by the eyesight of the viewer, especially when the picture is viewed from a greater distance. But interference of this kind can also be suppressed electronically by means of a weighted line addition as described in GB-A-2 141 303.

BRIEF DESCRIPTION OF THE FIGURE

The invention will now be discussed by reference to an embodiment illustrated in the sole figure hereof. The said figure shows a block diagram of a station (television transmitter) employing the line-to-line phase switching in accordance with the present invention.

POSSIBLE EMBODIMENTS OF THE INVENTION

The block diagram shown in the figure comprises the following blocks of a conventional television transmitter: a modulator 1, a carrier wave oscillator 2, an antenna coupling 3, and an antenna 4. The modulator, operating in the usual manner, modulates the carrier signal supplied by the carrier wave oscillator with a video signal that is likewise supplied to it. The television signal thus produced by the modulator is then fed to the antenna 4 via the antenna coupling 3, whence it is broadcast.

The video signal supplied to the modulator 1 may be obtained in any arbitrary manner. As regards the block diagram shown in the figure, it is assumed that it is supplied by a television camera that is provided with synchronization and scanning signals by a pulse generator stage 6. It provides a phase shift signal to a phase switch 8 in the horizontal blanking period associated with each horizontal line in a field. These signals are also processed in a summation (adder) stage 7, where they are added to luminance and chrominance signals produced by the camera 5. As compared with the block diagram of a conventional television transmitter, the new feature of the block diagram shown in the figure appended hereto is the phase switch 8. This switch is controlled by the pulse generator stage 6 and applies its output signal to the carrier wave oscillator 2 with a view to switching the phase of the carrier signal through 180° from one line to the next within a field.

When the video signal is produced and applied to the modulator in some manner other than the one just described, by playback from a tape recorder for example, the horizontal synchronization pulses for line switching will be supplied by the video signal source, i.e. the tape recorder in the example just mentioned.

The effect of this measure applied at the transmitter end will become evident when the television signals processed in this manner reach the receiver, an aspect that will now be considered in greater detail.

Let it be assumed that the tuner of a television receiver is set to receive a programme in a channel in which two transmitters are broadcasting, one powerfully and the other weakly, and that the two transmitters have not established any offset relationship, i.e. that they are transmitting at exactly the same frequency. Let it further be assumed that the two transmitters are broadcasting pictures that are different from each other at each and every moment of time. Now, it is well known that the content of television pictures—at least as far as the greater part of the lines is concerned— changes only very slightly from one line to the next within a field. In the case here considered, this is as true for the picture transmitted by the powerful transmitter as it is for that broadcast by the weaker transmitter. At a given moment of time, let the television signal (i.e. the modulated carrier signal) from the stronger transmitter have a certain amplitude within a line, and let the same be true for the signal arriving from the weaker transmitter. When the same relative point of time is reached in the next line, given the slight change of the information content between any two successive lines, the amplitudes of the two signals would have more or less the same value as before if the signal of neither of the two transmitters has undergone the phase inversion described above. For the moment, let us assume the weaker transmitter to be the one that employs phase inversion from one line to the next. In that case the signal of the more stronger transmitter will have the same positive value at the moment of time within the line here considered as in the previous line, while the signal of the more weaker transmitter will now have a negative value, though numerically the amplitude will be the same as in the previous line. For in our example, therefore the amplitude of the signal of the more stronger transmitter is enhanced in the first line and reduced at the same moment of time in the second line. This remains true quite independently of whether amplitude or frequency modulation has been used to modulate the carrier signal, and remains true even if amplitude modulation has been used in one case and frequency modulation in the other. What is essential is only that the content of both pictures should change only slightly from one line to the next, which is always the case when video signals in the same channel are subject to optical interference, and that the carriers of both stations should undergo only a slight phase shift within the space of a line, a condition that is likewise satisfied.

The result is that the error imposed upon the more strongly received signal changes sign from one line to the next. If this error produces an increase in brightness in a given pixel of the first line, it will therefore produce a corresponding darkening at the pixel in the same horizontal position of the second line. This brightening in the first line and darkening in the second line produced by the interference will optically compensate for one another in all pixels situated along any two adjacent lines within a field.

The same thing will happen when the phase of the stronger transmitter is inverted from one line to the next rather than that of the weaker transmitter. Once again, let the signals of both transmitters be positive for a given pixel in the first line. In the second line, therefore, the signal of the transmitter causing the interference will still be positive at a pixel in the same horizontal position, while the signal of the more stronger transmitter will have its phase inverted and will therefore be negative at the same point. Once again, therefore, the transmitter causing the interference produces opposite effects from one line to the next. It should be borne in mind that the high frequency modulator of the television receiver will always adjust to the stronger signal, so that its work will be only very slightly affected by the phase inversion of the carrier of what in the example has been assumed to be the weaker signal. It will therefore always process the signal of the more stronger transmitter as the main signal and the signal of the more weakly received station as the interference signal, and this quite independently of which of the two transmitters works with line-to-line phase inversion. When the phase of the stronger transmitter is switched, the demodulator will be subject to interference for a brief period of time, but this is compensated within a few oscillations of the carrier signal. Given the high frequency of the carrier signal, this brief interference is so short that the disturbance will hardly be perceived even when the switching is effected in the visible part of the line. However, with a view to eliminating all possibility of such interference becoming visible, which could happen in unfavourable cases, it will be advantageous to effect the inversion of the carrier signal phase within the duration of the non-visible part of the line.

What has so far been said is underlain by the assumption that the interference produced by one of the transmitters will act in opposite directions from one line to the next and will therefore be compensated by the vision of the viewer. But it is also possible to rely on electronic compensation by means of a conventional disturbance suppression circuit, where the signals of two lines, i.e. the signals of a second line and those of a first line retarded through one horizontal period, are added to each other. Such methods exploit the aforementioned fact that in a video signal the information content of two successive lines generally undergoes only slight changes, while statistically distributed interference signals are present. When the video signals are added together, the line-to-line phase inversion of the interference signal ensures that it is eliminated, while other disturbance signals, especially [white] noise, are reduced by 3 dB (to $\sqrt{2}/2$). But distortions can still occur when the picture content changes horizontally. It is however known that in such cases undesired compensation (averaging) by the noise suppression method here described can be avoided by modifying the method by subtracting the signals of one line from those of the other, and then adding the difference signal to the aforementioned product of adding the two signals when appropriate conditions are satisfied, i.e. when the difference exceeds a certain value. This ensures that smaller differences of the kind produced by noise signals or interference signals from a weaker transmitter using the same channel will be suppressed, while marked horizontal picture content changes will cause a strong difference signal to be added to the aforesaid sum, so that the compensating influence of the first addition will be canceled out. Such a method has been described in detail, in GB-A-2 141 303 for example.

I claim:

1. A method of transmitting first and second independent television signals for broadcasting by independent transmitters at different places using a same channel frequency range for unmodulated luminance carrier waves of the first and second independent television signals wherein the luminance carrier waves of the first and second independent television signals are modulated with different first and second video signals, respectively, comprising the steps of:

inverting the phase of oscillations of the second unmodulated luminance carrier wave each line of the corresponding video signal by a duration of one line and modulating the phase inverted second unmodulated luminance carrier wave with the second video signal for transmitting the second independent television signal for broadcast.

2. A method in accordance with claim 1, whereby the step of inverting is effected within a time period corresponding to a non-visible part of the line.

3. Apparatus for independently providing a first television signal for broadcast by a first broadcast transmitter in conjunction with a second television signal which is independently broadcast by a second broadcast transmitter wherein carrier waves of the first and second television signals utilize a same channel frequency range and are modulated with different first and second video signals, respectively, and wherein the places of the transmitters are different also, comprising:

means for inverting the phase of oscillations of the carrier wave of the first television signal each line of the first video signal by a duration of one line and means for modulating the phase inverted carrier wave with the first video signal for providing the first television signal for broadcast by the first broadcast transmitter.

4. The apparatus of claim 3, wherein the phase inversion is effected within a time period corresponding to a non-visible part of the line.

* * * * *